(12) United States Patent
Navratil et al.

(10) Patent No.: US 11,418,926 B2
(45) Date of Patent: Aug. 16, 2022

(54) METHOD OF MULTICAST DATA DELIVERY IN 5G SUPPORTING CLOUD ARCHITECTURE

(71) Applicant: Nokia Technologies Oy, Espoo (FI)

(72) Inventors: David Navratil, Helsinki (FI); Athul Prasad, Naperville, IL (US); Mikko Saily, Laukkoski (FI); Andreas Maeder, Würzburg (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/264,119

(22) PCT Filed: Aug. 13, 2019

(86) PCT No.: PCT/IB2019/056876
§ 371 (c)(1),
(2) Date: Jan. 28, 2021

(87) PCT Pub. No.: WO2020/035795
PCT Pub. Date: Feb. 20, 2020

(65) Prior Publication Data
US 2021/0168570 A1 Jun. 3, 2021

Related U.S. Application Data

(60) Provisional application No. 62/718,648, filed on Aug. 14, 2018.

(51) Int. Cl.
*H04W 4/06* (2009.01)
*H04W 76/12* (2018.01)
(Continued)

(52) U.S. Cl.
CPC ......... *H04W 4/06* (2013.01); *H04W 28/0263* (2013.01); *H04W 28/0268* (2013.01);
(Continued)

(58) Field of Classification Search
CPC ....... H04W 4/06; H04W 76/12; H04W 76/11; H04W 28/0263; H04W 28/0268; H04W 72/005
See application file for complete search history.

(56) References Cited

U.S. PATENT DOCUMENTS

| 8,243,642 B2 | 8/2012 | Bakker et al. |
| 8,472,380 B2 | 6/2013 | Etemad et al. |
(Continued)

FOREIGN PATENT DOCUMENTS

| EP | 1507364 A2 | 2/2005 |
| EP | 2362705 A1 | 8/2011 |
(Continued)

OTHER PUBLICATIONS

"3rd Generation Partnership Project; Technical Specification Group Radio Access Network; NR; NR and NG-RAN Overall Description; Stage 2 (Release 15)", 3GPP TS 38.300, V0.4.1, Jun. 2017, pp. 1-55.

(Continued)

*Primary Examiner* — Ajay Cattungal
(74) *Attorney, Agent, or Firm* — Nokia Technologies Oy

(57) ABSTRACT

In accordance with some embodiments, a method may include receiving, by a first network entity, at least one user equipment context modification request from a second network entity. The method may further include configuring, by the first network entity, at least one of one or more unicast channels and one or more multicast channels. The method may further include receiving, by the first network entity, multicast data. The method may further include selecting, by the first network entity, at least one of one or more multicast channels and one or more unicast channels to transmit multicast data.

18 Claims, 5 Drawing Sheets

(51) Int. Cl.
*H04W 76/11* (2018.01)
*H04W 28/02* (2009.01)
*H04W 72/00* (2009.01)

(52) U.S. Cl.
CPC .......... *H04W 72/005* (2013.01); *H04W 76/11* (2018.02); *H04W 76/12* (2018.02)

(56) References Cited

U.S. PATENT DOCUMENTS

| | | | |
|---|---|---|---|
| 9,961,688 B1 | 5/2018 | Anvari | |
| 11,228,974 B2* | 1/2022 | Park | H04L 5/0091 |
| 2008/0025241 A1 | 1/2008 | Bhushan et al. | |
| 2008/0253322 A1 | 10/2008 | So et al. | |
| 2013/0028118 A1 | 1/2013 | Cherian et al. | |
| 2013/0148597 A1 | 6/2013 | Lee et al. | |
| 2013/0148605 A1 | 6/2013 | Jin et al. | |
| 2014/0362694 A1 | 12/2014 | Rodrigues | |
| 2015/0043491 A1 | 2/2015 | Eng et al. | |
| 2017/0034756 A1* | 2/2017 | Faccin | H04W 36/22 |
| 2017/0070864 A1 | 3/2017 | Dabak et al. | |
| 2017/0374581 A1* | 12/2017 | Dao | H04W 28/06 |
| 2018/0042040 A1 | 2/2018 | Chen et al. | |
| 2021/0234717 A1* | 7/2021 | Speicher | H04W 28/0252 |

FOREIGN PATENT DOCUMENTS

| | | | | |
|---|---|---|---|---|
| EP | 3200498 A1 | 8/2017 | | |
| EP | 3577856 A1 | 12/2019 | | |
| EP | 3123781 B1 * | 9/2020 | ............ | H04W 12/08 |
| WO | 2005/027543 A1 | 3/2005 | | |
| WO | 2013/127665 A1 | 9/2013 | | |
| WO | WO-2015144253 A1 * | 10/2015 | ............ | H04W 12/08 |
| WO | 2017/099520 A1 | 6/2017 | | |
| WO | 2017/131690 A1 | 8/2017 | | |
| WO | 2018/144081 A1 | 8/2018 | | |
| WO | 2019/114938 A1 | 6/2019 | | |
| WO | 2019/114939 A1 | 6/2019 | | |
| WO | 2019/161927 A1 | 8/2019 | | |

OTHER PUBLICATIONS

Zaidi et al., "Waveform and Numerology to Support 5G Services and Requirements", IEEE Communications Magazine, vol. 54, No. 11, Nov. 2016, pp. 90-98.
Prasad et al., "Enabling Group Communication for Public Safety in LTE-Advanced Networks", Journal of Network and Computer Applications, vol. 62, 2016, pp. 41-52.
Konrad et al., "Throughput Based Switching Threshold For multicast and Unicast in Cellular OFDM Networks", IEEE 66th Vehicular Technology Conference, Sep. 30-Oct. 3, 2007, pp. 1927-1931.
International Search Report and Written Opinion received for corresponding Patent Cooperation Treaty Application No. PCT/EP2017/071923, dated May 4, 2018, 14 pages.
"3rd Generation Partnership Project; Technical Specification Group Radio Access Network; NR; NR and NG-RAN Overall Description; Stage 2 (Release 15)", 3GPP TS 38.300, V15.1.0, Mar. 2018, pp. 1-71.
"3rd Generation Partnership Project; Technical Specification Group Radio Access Network; NG-RAN; Architecture description (Release 15)", 3GPP TS 38.401, V15.1.0, Mar. 2018, pp. 1-23.
"3rd Generation Partnership Project; Technical Specification Group Radio Access Network; NG-RAN; NG general aspect and principles (Release 15)", 3GPP TS 38.410, V0.9.0, Apr. 2018, 14 pages.
"3rd Generation Partnership Project Technical Specification Group Radio Access Network; NG-RAN; NG Application Protocol (NGAP) (Release 15)", 3GPP TS 38.413, V0.8.0, Apr. 2018, 166 pages.
"3rd Generation Partnership Project; Technical Specification Group Radio Access Network NG-RAN; F1 application protocol (F1AP) (Release 15)", 3GPP TS 38.473, V15.1.1, Apr. 2018, pp. 1-106.
"3rd Generation Partnership Project; Technical Specification Group Radio Access Network; NR; Radio Resource Control (RRC) protocol specification (Release 15)", 3GPP TS 38.331, V15.1.0, Mar. 2018, pp. 1-268.
International Search Report and Written Opinion received for corresponding Patent Cooperation Treaty Application No. PCT/IB2019/056876, dated Dec. 10, 2019, 14 pages.
"3rd Generation Partnership Project; Technical Specification Group Radio Access Network; NG-RAN; Architecture description (Release 15)", 3GPP TS 38.401, V15.2.0, Jun. 2018, pp. 1-39.
Office action received for corresponding European Patent Application No. 17764537.1, dated Mar. 16, 2021, 7 pages.
Non-Final Office action received for corresponding U.S. Appl. No. 16/642,658, dated May 26, 2021, 7 pages.
Office action received for corresponding European Patent Application No. 19779571.9, dated Apr. 29, 2022, 5 pages.

* cited by examiner

METHOD OF MULTICAST DATA DELIVERY IN 5G SUPPORTING CLOUD ARCHITECTURE

RELATED APPLICATION

This application claims priority to PCT Application No. PCT/IB2019/056876, filed on Aug. 13, 2019, which claims priority to U.S. Application No. 62/718,648, filed on Aug. 14, 2018, each of which is incorporated herein by reference in its entirety.

BACKGROUND

Field

Certain embodiments may relate to wireless communication systems. For example, some embodiments may relate to multicasting.

Description of the Related Art

In an architecture illustrated in FIG. 1 for enabling multicasting, a user plane function (UPF) receives multicast data over an N6 reference point. The multicast data is transported to RAN nodes over core network tunnels at various reference points. The resources in the network are allocated based on user equipment attempting to receive multicast, such as Internet Group Message Protocol/Multicast Listener Discovery (IGMP/MLD). The outcome of core network procedures, such as PDU session modification for each UE, is that the RAN is aware of the list of user equipment requesting multicast data via the core network tunnel. The RAN is also aware of the location of user equipment by a single cell or by cell group defined, for example, as RAN multicast area (RMA) in RRC_CONNECTED and RRC_INACTIVE states, respectively.

However, one of the challenges with current multicasting techniques is that they are incapable of seamless selection of unicast/multicast transport channels, and thus, the MCS selection is driven by the cell area and service level of user equipment in unfavorable radio conditions, limiting the capacity of the multicasting system. It is desirable to provide a cloud-compatible NG-RAN architecture so that the NG-RAN may perform the dynamic selection of unicast and multicast transport channels, including radio bearers, for efficient transmission of multicast data to user equipment.

SUMMARY

In accordance with some embodiments, a method may include receiving, by a first network entity, at least one user equipment context modification request from a second network entity. The method may further include configuring, by the first network entity, at least one of one or more unicast channels and one or more multicast channels. The method may further include receiving, by the first network entity, multicast data. The method may further include selecting, by the first network entity, at least one of one or more multicast channels and one or more unicast channels to transmit multicast data.

In accordance with some embodiments, an apparatus may include means for receiving at least one user equipment context modification request from a network entity. The apparatus may further include means for configuring at least one of one or more unicast channels and one or more multicast channels. The apparatus may further include means for receiving multicast data. The apparatus may further include means for selecting at least one of one or more multicast channels and one or more unicast channels to transmit multicast data.

In accordance with some embodiments, an apparatus may include at least one processor and at least one memory including computer program code. The at least one memory and the computer program code can be configured to, with the at least one processor, cause the apparatus to at least receive at least one user equipment context modification request from a network entity. The at least one memory and the computer program code can be further configured to, with the at least one processor, cause the apparatus to at least configure at least one of one or more unicast channels and one or more multicast channels. The at least one memory and the computer program code can be further configured to, with the at least one processor, cause the apparatus to at least receive multicast data. The at least one memory and the computer program code can be further configured to, with the at least one processor, cause the apparatus to at least select at least one of one or more multicast channels and one or more unicast channels to transmit multicast data.

In accordance with some embodiments, a non-transitory computer readable medium can be encoded with instructions that may, when executed in hardware, perform a method. The method may include receiving at least one user equipment context modification request from a network entity. The method may further include configuring at least one of one or more unicast channels and one or more multicast channels. The method may further include receiving multicast data. The method may further include selecting at least one of one or more multicast channels and one or more unicast channels to transmit multicast data.

In accordance with some embodiments, an apparatus may include circuitry configured to receive at least one user equipment context modification request from a network entity. The circuitry may further be configured to configure at least one of one or more unicast channels and one or more multicast channels. The circuitry may further be configured to receive multicast data. The circuitry may further be configured to select at least one of one or more multicast channels and one or more unicast channels to transmit multicast data.

In accordance with some embodiments, a computer program product may perform a method. The method may include receiving at least one user equipment context modification request from a network entity. The method may further include configuring at least one of one or more unicast channels and one or more multicast channels. The method may further include receiving multicast data. The method may further include selecting at least one of one or more multicast channels and one or more unicast channels to transmit multicast data.

In accordance with some embodiments, a method may include receiving, by a first network entity, at least one session resource modify request from a second network entity. The method may further include transmitting, by the first network entity, at least one user equipment context modification request to a third network entity. The method may further include receiving, by the first network entity, at least one user equipment context modification response from the third network entity.

In accordance with some embodiments, an apparatus may include means for receiving at least one session resource modify request from a first network entity. The apparatus may further include means for transmitting at least one user equipment context modification request to a second network entity. The apparatus may further include means for receiving at least one user equipment context modification response from the second network entity.

In accordance with some embodiments, an apparatus may include at least one processor and at least one memory including computer program code. The at least one memory and the computer program code can be configured to, with the at least one processor, cause the apparatus to at least receive at least one session resource modify request from a first network entity. The at least one memory and the computer program code can be further configured to, with the at least one processor, cause the apparatus to at least transmit at least one user equipment context modification request to a second network entity. The at least one memory and the computer program code can be further configured to, with the at least one processor, cause the apparatus to at least receive at least one user equipment context modification response from the second network entity.

In accordance with some embodiments, a non-transitory computer readable medium can be encoded with instructions that may, when executed in hardware, perform a method. The method may include receiving at least one session resource modify request from a first network entity. The method may further include transmitting at least one user equipment context modification request to a second network entity. The method may further include receiving at least one user equipment context modification response from the second network entity.

In accordance with some embodiments, an apparatus may include circuitry configured to receive at least one session resource modify request from a first network entity. The circuitry may further be configured to transmit at least one user equipment context modification request to a second network entity. The circuitry may further be configured to receive at least one user equipment context modification response from the second network entity.

In accordance with some embodiments, a computer program product may perform a method. The method may include receiving at least one session resource modify request from a first network entity. The method may further include transmitting at least one user equipment context modification request to a second network entity. The method may further include receiving at least one user equipment context modification response from the second network entity.

BRIEF DESCRIPTION OF THE DRAWINGS

For proper understanding of this disclosure, reference should be made to the accompanying drawings, wherein.

DETAILED DESCRIPTION

Certain embodiments described herein may help to manage multicasting. The example embodiments described herein may have various benefits and/or advantages. For example, some embodiments may save fronthaul resources by only requiring one copy of multicast data to be sent from a central unit to a distributed unit. Furthermore, a switching function may be part of a link adaptation, which may jointly consider the feedback from one or more user equipment receiving the multicast, while also optimizing the radio resource management. In addition, switching selection allows adaptation of multicast data delivery to certain user equipment when the reported quantities indicate poor radio conditions when compared to others, allowing seamless selection of unicast transport channels for user equipment, thus improving the system capacity of multicast transport channels with higher order MCS. Certain embodiments are, therefore, directed to improvements in computer-related technology, specifically, by conserving network resources and reducing power consumption of network entities and/or user equipment located within the network.

The proposed solution allows NG-RAN to decide whether multicast data of a radio bearer should be sent over unicast and/or multicast transport channels. The NG-RAN may receive information about user equipment desiring to receive multicast data as part of PDU session procedures. Thus, multicast data, such as data sent to an internet protocol multicast group, may be delivered to NG-RAN over an N3 tunnel, which may be GTP-U over unicast or multicast IP. The NG-RAN may know the identity of user equipment for each N3 tunnel that desires to receive the multicast data. For example, this could include user equipment which had a successful PDU session modification/creation procedure for multicasting. This solution is based on transport channel selection below PDCP layers, which map traffic either to unicast or multicast transport channels, depending on the content type and other criteria.

Figure 1:
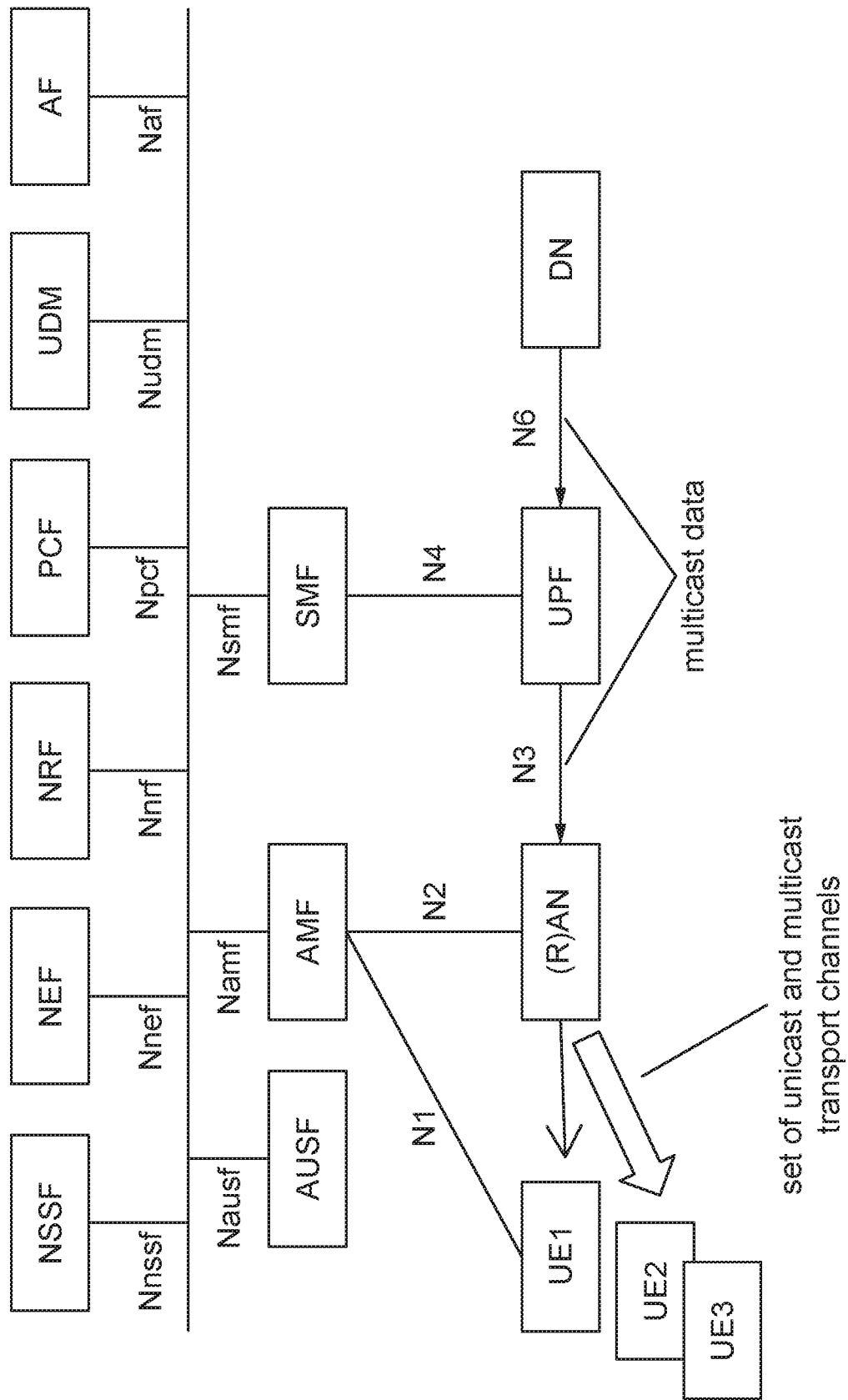
FIG. 1 illustrates an example of a high level system architecture for enabling multicast in a 5G network.
Figure 2:
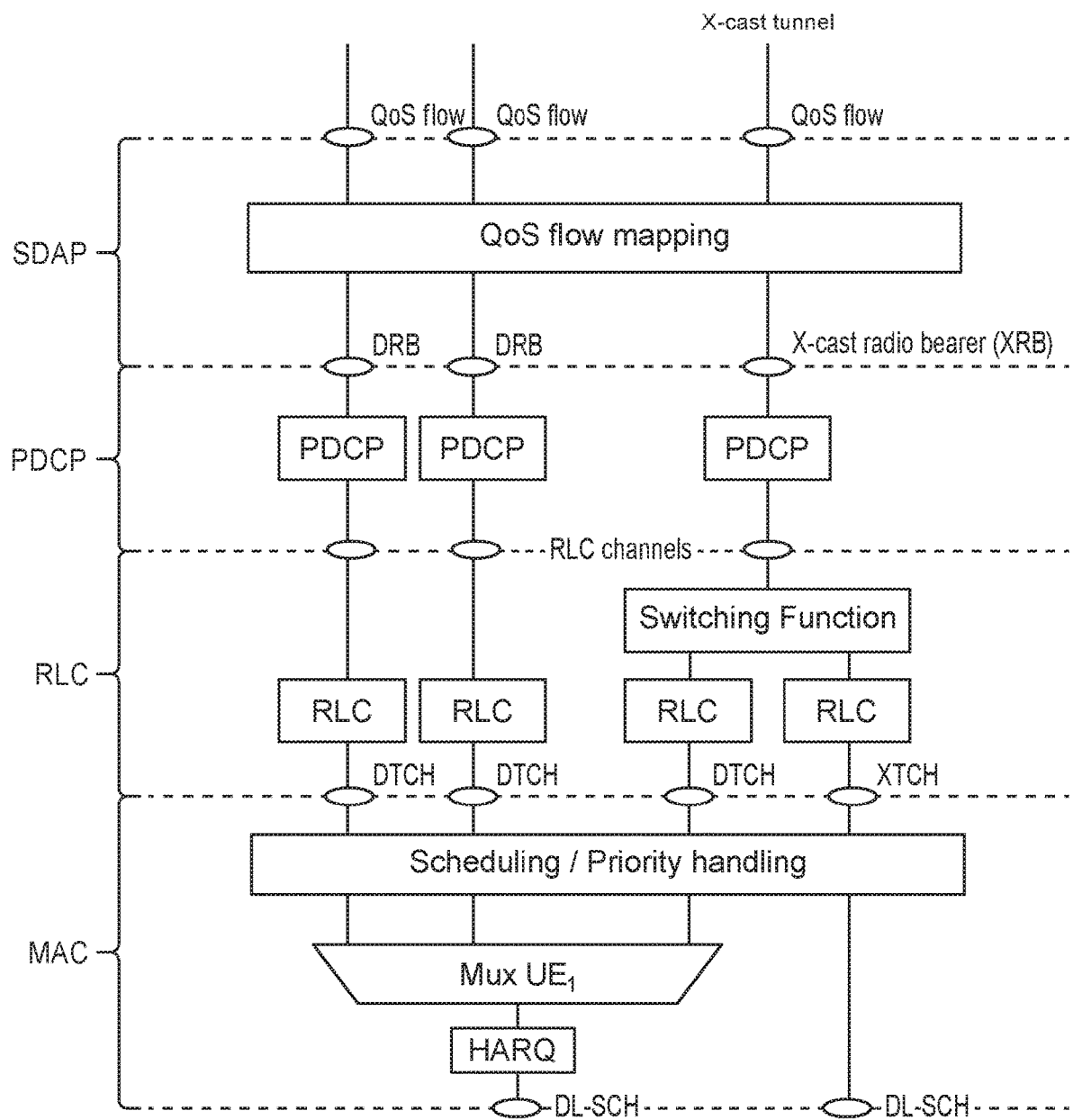
FIG. 2 illustrates an example of a Layer 2 downlink structure with x-cast bearer according to certain embodiments.

FIG. 2 illustrates a Layer 2 (L2) radio protocol architecture according to certain embodiments. Using the depicted "X-cast tunnel," multicast data may be delivered to the NG-RAN over a data tunnel. The "X-cast tunnel" uses a dynamic selection process of RLC entities and transport channels for the transmission. The L2 architecture for multicast may augment the unicast L2 architecture to provide a more efficient implementation and performance enhancements. Multicast traffic may comprise multiple QoS flows, which may allow SDAP to map QoS flows to a set of X-cast radio bearers to allow different treatment at lower layers, such as due to different QoS requirements of the flows.

PDCP may provide sequence numbering and duplication detection. In some embodiments, duplication detection may be beneficial by allowing UE to receive the same PDCP PDU over DTCH and XTCH, such as during bearer switching or as a means for improving packet reliability.

A switching function may be utilized that locates the switching below PDCP but above an RLC layer, or logically placed as part of RLC. In the event of CU/DU split architecture with F1 fronthaul interface, the functionality may be placed in the DU. For one or more UE receiving multicast data, such as where UE desiring to receive multicast and/or PDU session modification procedures have been completed, a pair of RLC entities and logical channels, such as DTCH and XTCH channels, may be set up to transmit the multicast data over the air. In some embodiments, the multicast logical channels may be shared between all or some multicast UE. Furthermore, several multicast channels, including logical and physical, may be configured for each cell, cell group, or RMA, such as for beamforming configurations. Where PDCP is utilized, a single RLC channel may be used.

In some embodiments, switching may be based upon the availability of UE measurements and/or the reported quantities in the measurements, such as SS-RSSP, CSI-RSRP, SS-RSRQ, and/or CSI-RSRQ. Additionally other quantities may be used, such as BLER and/or RSSI. As an example, if measurements are not available, a switching function may route traffic through multicast transport channels, while in another example, measurement reports may indicate poor radio conditions for some user equipment, which may cause the switching function to use unicast transport channels for those user equipment, and multicast transport channels for other user equipment. When creating an XRB, the RRC may configure thresholds in the switching function, which may indicate when to use unicast. Alternatively, thresholds may indicate multicast logical channels, such as thresholds for measurements, or other thresholds like the minimum number of user equipment required for switching to multicast transport.

For links which use beam forming, the measurement reports may be received on a beam level, where RAN may also utilize reported beam information in the selection process. The measurement reports may contain location and time information associated with the radio measurements, which may be used in the switching decision. The switching decision may take into account the QoS profile of the traffic, and the network may schedule traffic over multicast or broadcast for traditional broadcast services. The network may prioritize unicast over multicast for high-quality immersive content type of traffic if there are available radio resources and/or sufficient quality links to each UE subscribing to the traffic.

Figure 3:
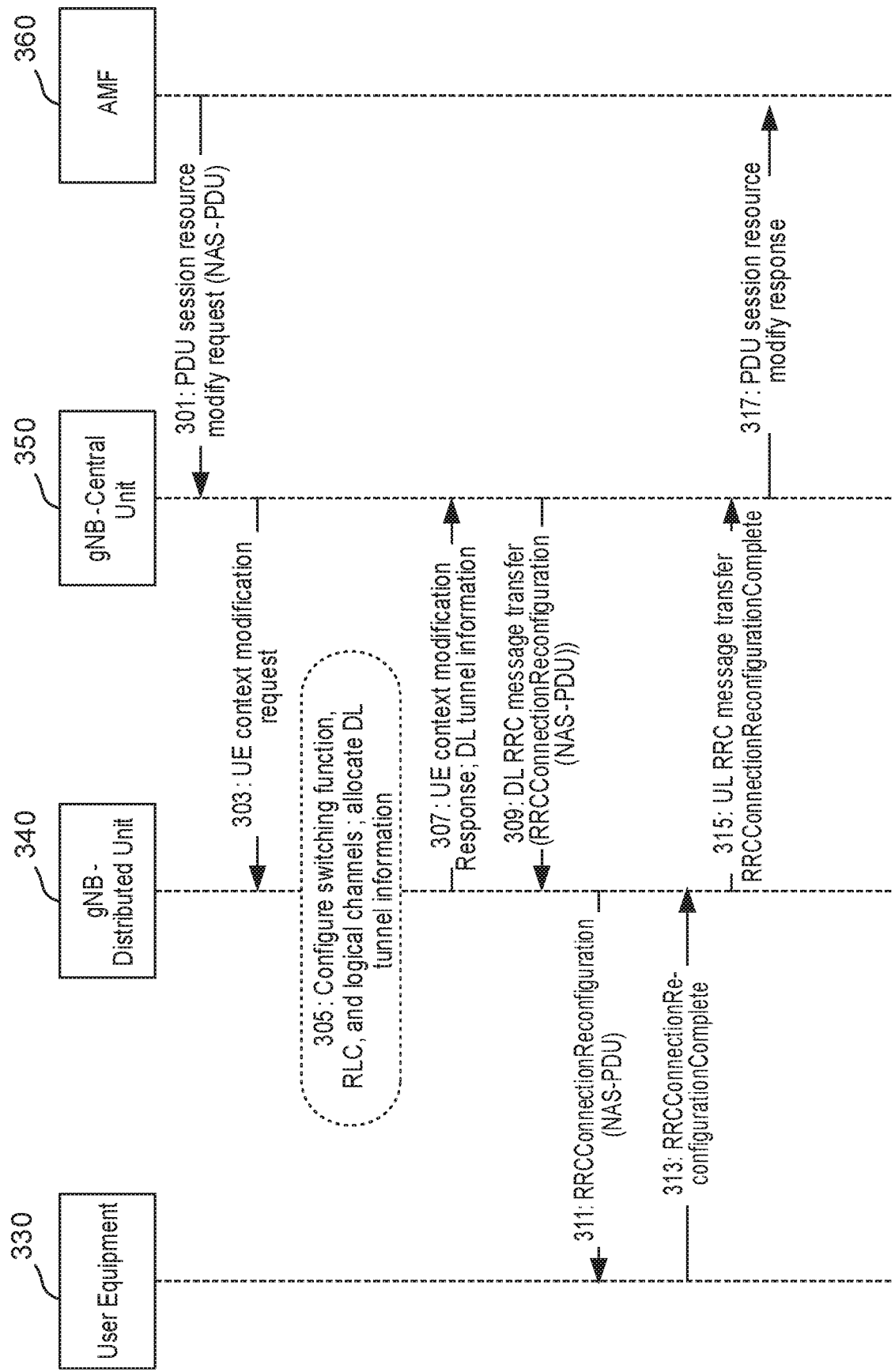
FIG. 3 illustrates a signaling diagram according to certain embodiments.

FIG. 3 illustrates an example of a signalling diagram according to some embodiments. In particular, FIG. 3 illustrates a call flow for a first UE joining an IP multicast group. The PDU session modification procedure may be performed for all UE, but some messages may be optional for subsequent UE joining the group. gNB distributed unit (gNB-DU) 340, gNG-central unit (gNB-CU) 350, and/or AMF 360 may be similar to network entity 520 in FIG. 5. In addition, user equipment 330 may be similar to user equipment 510 in FIG. 5. Although only a single UE, gNB-DU, gNB-CU, and AMF are illustrated, a communications network may contain one or more of each of these entities.

In step 301, AMF 360 may transmit at least one PDU session resource modify request (NAS-PDU) to gNB-CU 350. In some embodiments, this message may include multicast context-related configuration information. For example, the multicast context-related configuration information may include at least one of UP transport layer information for multicast traffic, multicast address information and/or an alias identifier (such as a multicast context ID) identifying one or more multicast groups from which the UE wants to receive traffic, and quality of service (QoS) flow information, such as indicators and QoS parameters. In certain embodiments where the user plane transport layer information and/or QoS flow information are unchanged, this information may be omitted in subsequent PDU session resource modify requests for additional UE. In some embodiments, for the first UE context modification request transmitted, the network entity may allocate at least one PDCP entity associated with a new XRB with an identity, such as an XRB identity, and/or an downlink tunnel information for the XRB, such as an IP multicast address, an IP source address and a tunnel end-point identifier. In certain embodiments, the call flow for subsequent UE may include only XRB identity.

In step 303, in response to receiving the at least one NAS-PDU, gNB-CU 350 may transmit at least one UE context modification request to gNB-DU 340. The at least one UE context modification request may include at least one of DL tunnel information, XRB identity, QoS information selected by gNB-CU 350 based on the mapping of QoS flows to a radio bearer at SDAP, and switching configuration. In some embodiments, gNB-CU 350 may decide to map one or more QoS flows to at least one radio bearer, such as XRB.

In some embodiments, the XRB Identity may be a unique identification of the bearer, similar to the unicast bearer (DRB Identity). The description of the PDU session modification may be associated with a XRB Identity that is unique at least per gNB-DU and/or per gNB. In addition, the range of DRB Identity may be 32 values, or any other value. If the same range is used for XRB Identity, then the number of concurrently active Xcast configurations may not be sufficient, and the range of XRB Identity may be larger.

In some embodiments, the gNB-CU may include a multicast context identity in the UE CONTEXT MODIFICATION REQUEST message as a reference to a multicast flow, and/or the XRB Identity may be unique per UE with the same semantics as the DRB Identity. The gNB-CU may map XRB Identities to a multicast content identity, and/or gNB-DU 340 may use the multicast content identity to determine whether the multicast transport for a multicast flow is or is not configured.

If gNB-CU 330 needs to modify any configuration related to XBR, such as the DL tunnel information or QoS, then it could initiate the UE context modification procedure for one of the UEs currently configured with the XRB, such as those associated with the IP multicast group. Alternatively, a new set of procedures for multicast context management, which may not include UE identities, may be introduced in F1AP.

In some embodiments, where gNB-DU 340 needs to modify at least one configuration related to XTCH, UE may also need to be reconfigured. The UE reconfiguration may include one or more of a dedicated signaling, such as where gNB-CU 330 initiates RRCConnectionReconfiguration procedure for all user equipment and/or XRB configuration may be broadcast in system information messages always or on-demand.

In certain embodiments, the UE CONTEXT MODIFICATION REQUEST MESSAGE used to request XRB addition and/or modifications may be extended with one or more information elements, such as:

| | | | | | |
|---|---|---|---|---|---|
| XRB to Be Setup List | | 0..1 | | YES | reject |
| >XRB to Be Setup Item IEs | | 1 .. <maxnoofXRBs> | | EACH | reject |
| >>XRB Identity | M | | 9.3.1.8 | | — |
| >>5G QoS | O | | | | |
| >>switching configuration | O | | | | |

| | | | | |
|---|---|---|---|---|
| >>DL Tunnels to be setup List | 0..1 | | | |
| >>>DL Tunnels to Be Setup Item IEs | 1 .. <maxnoofULTunnels> | | | |
| >>>>IP Multicast Address | M | IP Address | | |
| >>>>IP Source Address | M | IP Address | | |
| >>>>DL GTP Tunnel Endpoint | M | GTP Tunnel Endpoint 9.3.2.1 | Endpoint of the F1 transport bearer. | — — |

In some embodiments, the RLC-Bearer-Config IE may be modified by adding xrb-Identity to the message. For example, the RLC-Bearer-Config IE could include:

```
servedRadioBearer       Choice {
    srb-Identity           SRB-Identity
    drb-Identity           DRB-Identity
    xrb-Identity           XRB-Identity
}
```

In certain embodiments, the switching function may be located in a gNB-CU or gNB-DU, depending on the logical architecture and the network node where the necessary measurements are available. Additionally or alternatively, the measurements used for switching may be based on any 5G/NR measurement capabilities. For example, if the switching function is located at the gNB-CU, a separate F1 tunnel for each RLC entity (RLC channel) needs to be setup to carry the XRB data. Alternatively, one F1 tunnel may be setup to carry the XRB data and the outcome of switching function needs to be provided to gNB-DU, e.g. within the header of F1 tunneling protocol. The outcome of switching function may be a set of UEs to which the XRB data should be transmitted using DTCH, and may be signaled using one or more UE identities and/or UE associated F1 connections.

In step 305, in response to receiving the at least one UE context modification request, gNB-DU 340 may configure a switching function, RLC channels, and/or one or more logical channels for XRB bearer and/or DL tunnel information. In some embodiments, gNB-DU 340 may configure unicast transport information by creating an RLC entity mapped to a single RLC channel towards PDCP, and/or may be mapped to a corresponding logical channel in MAC, according to DRB setup procedures.

In certain embodiments, the switching function may be configured according to at least one switching configuration, such as thresholds for measurements and/or a minimum number of multicast UE. In some embodiments, if there is no multicast transport configured, such as where the same value of XRB Identity is not using part of any active UE context at the gNB-DU, a new RLC entity and/or corresponding mapping to a multicast logical channel (XTCH) may be created. The RLC entity may be mapped to the same RLC channel when gNB-DU 340 configures the unicast transport. Additionally or alternatively, the configuration may include at least one of logical channel identities, RLC configuration, such as mode, sequence number field length, and/or timer values, MAC configuration, such as XRB-specific DRX, and PHY configuration, such as at least one RNTI value for the reception of XTCH scheduled on DL-SCH. When gNB-DU 340 receives the message in step 303 which indicates, e.g. by means of an XRB Identity or a multicast context identity, that XRB is already being associated with another UE, there may be an indication of a multicast transport already configured and/or gNB-DU 340 may use existing configuration rather than creating a new RLC entity and/or corresponding mapping to a XTCH.

In step 307, gNB-DU 340 may transmit at least one UE context modification response to gNB-CU 350. In some embodiments, the at least one UE context modification response may report the successful operation to gNB-CU 350 and/or may include the configuration information generated in step 305, including XTCH logical channel identity.

In step 309, in response to receiving the at least one UE context modification response, gNB-CU 350 may transmit at least one DL RRC message transfer to gNB-DU 340. For example, the at least one DL RRC message transfer may be an RRCConnectionReconfiguration (may also carry a NAS-PDU). RRC takes into account the response from gNB-DU on logical channel configuration. In some embodiments, the logical channel configuration using RRCConnectionReconfiguration may include information on logical channel mapping by adding the configuration of multicast transport. For example, RLC-Bearer-Config IE: logicalChannelIdenity may be set to the XTCH channel identity, and/or servedRadioBearer may be set to XRB identity, as configured in step 305. In embodiments associated with the configuration of unicast transport, the RLC-Bearer-Config IE: logicalChannelIdentity may be set to DTCH channel identity, and/or servedRadioBearer may be set to the same value of XRB identity.

In step 311, in response to receiving the at least one DL RRC message transfer, gNB-DU 340 may transmit at least one RRCConnectionReconfiguration (NAS-PDU) to UE 330. Upon receiving the at least one RRCConnectionReconfiguration, UE 330 may perform DRB Reconfiguration. For example, two RLC-bearer-config IEs may be present with the same servedRadioBearer identity. Where an XRB Identity is present, UE 330 may configure at least one bearer to deliver at least one PDU from both logical channels in RLC to one PDCP entity, which may be transparent to PDCP.

In response to receiving the at least one RRCConnection-Reconfiguration (NAS-PDU), in step 313, UE 330 may transmit at least one RRCConnectionReconfigurationComplete to gNB-DU 340. In step 315, in response to receiving the at least one RRCConnectionReconfigurationComplete, gNB-DU 340 may transmit at least one UL RRC message transfer to gNB-CU 350, such as an RRCConnectionReconfigurationComplete. In response to receiving the at least one UL RRC message transfer, in step 317, gNB-CU 350 may transmit at least one PDU session resource modify response to AMF 360.

Figure 4:
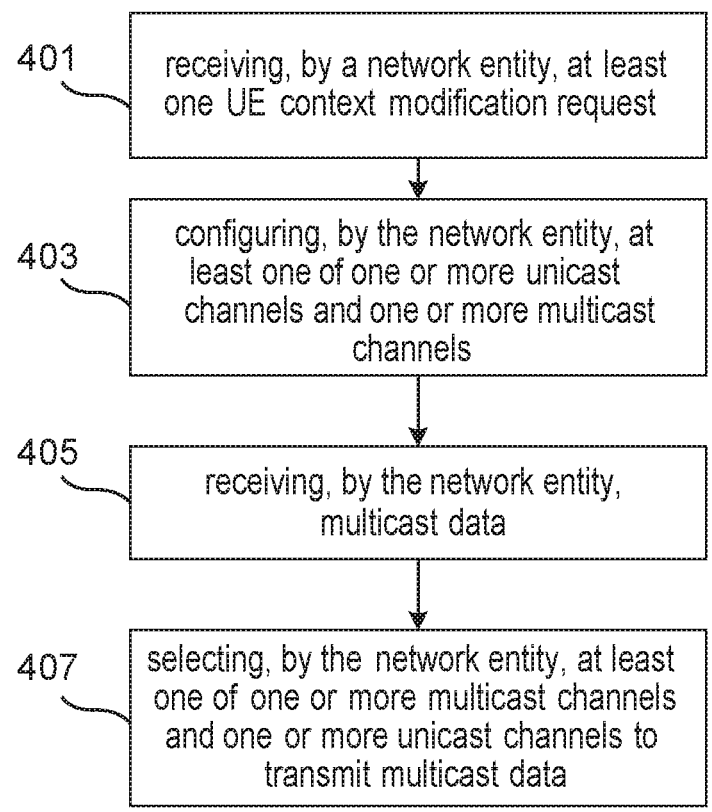
FIG. 4 illustrates an example of a method according to certain embodiments.
Figure 5:
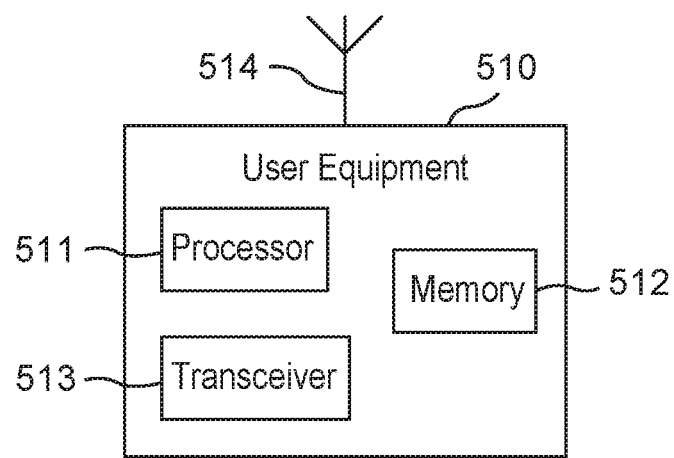
FIG. 5 illustrates an example of a system according to certain embodiments.
Figure 5:
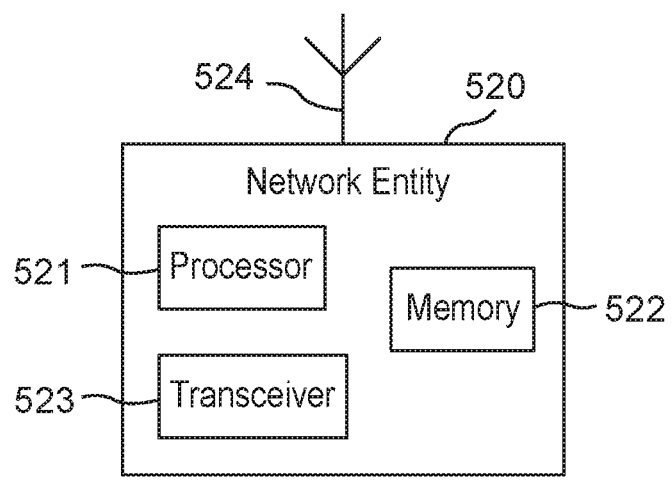

FIG. 4 illustrates an example of a method performed by a network entity, for example, network entity 520 in FIG. 5. In step 401, the network entity may receive at least one UE context modification request. The at least one UE context modification request may include at least one of DL tunnel information, XRB identity, QoS information, and switching configuration.

In step 403, the network entity may configure at least one of one or more unicast channels and one or more multicast channels. In some embodiments, the network entity may configure unicast transport information by creating an RLC entity mapped to a single RLC channel towards PDCP, and/or may be mapped to a corresponding logical channel in MAC, according to DRB setup procedures.

In certain embodiments, the switching function may be configured according to at least one switching configuration, such as thresholds for measurements and/or a minimum number of multicast UE. In some embodiments, if there is no multicast transport configured, such as where the same value of XRB Identity is not part of any active UE context at the network entity, a new RLC entity and/or corresponding mapping to a multicast logical channel (XTCH) may be created. The RLC entity may be mapped to the same RLC channel when the network entity configures the unicast transport. Additionally or alternatively, the configuration may include at least one of logical channel identities, RLC configuration, such as mode, sequence number field length, and/or timer values, MAC configuration, such as XRB-specific DRX, and PHY configuration, such as at least one RNTI value for the reception of XTCH scheduled on DL-SCH. When the network entity receives the message in step 401 which indicates, e.g. by means of an XRB Identity or a multicast context identity, that XRB is already being associated with another UE, there may be an indication of a multicast transport already configured and/or the network entity may use existing configuration rather than creating a new RLC entity and/or corresponding mapping to a XTCH.

In step 405, the network entity may receive multicast data. In step 407, the network entity may select at least one of one or more multicast channels and one or more unicast channels to transmit multicast data.

FIG. 5 illustrates an example of a system according to certain embodiments. In one embodiment, a system may include multiple devices, such as, for example, network entity 520 and user equipment 510. Network entity 520 may be one or more of a base station, such as an evolved node B (eNB) or next generation node B (gNB), a next generation radio access network (NG RAN), a serving gateway, a server, and/or any other access node or combination thereof.

UE 510 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

One or more of these devices may include at least one processor, respectively indicated as 511 and 521. At least one memory may be provided in one or more of devices indicated at 512 and 522. The memory may be fixed or removable. The memory may include computer program instructions or computer code contained therein. Processors 511 and 521 and memory 512 and 522 or a subset thereof, may be configured to provide means corresponding to the various blocks of FIGS. 1-4. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple radio access technologies. Other configurations of these devices, for example, may be provided.

Transceivers 513 and 523 may be a transmitter, a receiver, or both a transmitter and a receiver, or a unit or device that may be configured both for transmission and reception.

Processors 511 and 521 may be embodied by any computational or data processing device, such as a central processing unit (CPU), application specific integrated circuit (ASIC), or comparable device. The processors may be implemented as a single controller, or a plurality of controllers or processors.

Memory 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-4. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

3GPP 3rd Generation Partnership Project
4G 4th Generation Mobile Network
5G 5th Generation Mobile Network
CSI-RSRP CSI Reference Signal Received Power
CSI-RSRQ CSI Reference Signal Received Quality
CU Centralized Unit
DL Downlink
DTCH Dedicated Traffic Channel
DRB Data Radio Bearer
DU Distributed Unit
eMBMS Evolved Multimedia Broadcast/Multicast Services
F1 Logical Interface between gNB-CU and gNB-DU
IGMP Internet Group Management Protocol
MCS Modulation and Coding Scheme
MLD Multicast Listener Discovery
NG-RAN NG Radio Access Network
PDCP Packet Data Convergence Protocol
PDU Packet Data Unit
QoS Quality of Service
RAN Radio Access Network
RLC Radio Link Control
RMA RAN Multicast Area
RRC Radio Resource Control
SDAP Service Data Adaptation Protocol
SS-RSRP Synchronization Signal Reference Signal Received Power
SS-RSRQ Synchronization Signal Reference Signal Received Quality
UE User Equipment
UPF User Plane Function
XRB X-cast Radio Bearer
XTCH X-cast Traffic Channel

We claim:

1. An apparatus, comprising at least one processor and at least one memory including computer program code, wherein the at least one memory and the computer program code are configured to, with the at least one processor, cause the apparatus to:

receive at least one user equipment context modification request from a second network entity;
configure at least one of one or more unicast channels and one or more multicast channels;
receive multicast data; and
select at least one of the one or more multicast channels and the one or more unicast channels to transmit the multicast data, wherein the at least one user equipment context modification request comprises one or more of:
uplink tunnel end-point information;
downlink tunnel information;
at least one x-cast radio bearer identity;
quality of service information; and
at least one switching configuration.

2. The apparatus according to claim 1, wherein the at least one memory and the computer program code are configured to, with the at least one processor, cause the apparatus to configure unicast transport information based upon at least one radio link control entity mapped to a single radio link control channel towards packet data convergence protocol.

3. The apparatus according to claim 2, wherein the at least one radio link control entity is mapped to a corresponding logical channel in medium access control according to at least one data radio bearer setup procedure.

4. The apparatus according to claim 1, wherein the one or more multicast channels are multicast logical channels and the one or more unicast channels are unicast logical channels, and a switching function between unicast and multicast logical channel is configured according to at least one switching configuration.

5. The apparatus according to claim 4, wherein the at least one switching configuration comprises
one or more of at least one threshold for measurements;
a minimum number of user equipment receiving multicast;
at least one logical channel identity;
at least one radio link control configuration;
at least one medium access control configuration; and
at least one physical configuration.

6. The apparatus according to claim 1, wherein at least one new RLC entity and at least one corresponding mapping to at least one multicast logical channel is generated where at least one value of at least one x-cast radio bearer identity is not associated with any active user equipment associated with the first network entity.

7. The apparatus according to claim 6, wherein the x-cast radio bearer identity comprises at least one unique identification of the bearer.

8. The apparatus according to claim 1, wherein the at least one memory and the computer program code are configured to, with the at least one processor, cause the apparatus to:
determine whether a multicast transport for a multicast flow is or is not configured based upon a multicast content identity, wherein the configuring the one or more multicast channels is based on the determination.

9. The apparatus according to claim 1, wherein the at least one memory and the computer program code are configured to, with the at least one processor, cause the apparatus to:
transmit at least one user equipment context modification response to the second network entity comprising at least one multicast channel logical channel identity.

10. The apparatus according to claim 1, wherein the at least one memory and the computer program code are configured to, with the at least one processor, cause the apparatus to:
receive from the second network entity, at least one downlink radio resource control message comprising one or more of at least one multicast transport configuration in a first information element, at least one x-cast radio bearer identity in a second information element, and at least one dedicated traffic channel identity in a third information element.

11. The apparatus according to claim 1, wherein the user equipment context modification request message comprises at least one multicast context identity associated with at least one multicast flow, wherein the x-cast radio bearer identity uniquely corresponds with at least one user equipment associated with at least one same semantic as the data radio bearer identity.

12. An apparatus, comprising at least one processor and at least one memory including computer program code, wherein the at least one memory and the computer program code are configured to, with the at least one processor, cause the apparatus to:
receive at least one session resource modify request from a second network entity;
transmit at least one user equipment context modification request to a third network entity; and
receive at least one user equipment context modification response from the third network entity,
wherein the at least one user equipment context modification request comprises one or more of:
uplink tunnel end-point information;
downlink tunnel information;
at least one x-cast radio bearer identity;
quality of service information; and
at least one switching configuration.

13. The apparatus according to claim 12, wherein the at least one user equipment context modification response received from the third network entity comprises at least one multicast channel logical channel identity.

14. The apparatus according to claim 12, wherein the at least one memory and the computer program code are configured to, with the at least one processor, cause the apparatus to:
transmit to the third network entity, at least one downlink radio resource control message comprising one or more of at least one multicast transport configuration in a first information element, at least one x-cast radio bearer identity in a second information element, and at least one dedicated traffic channel identity in a third information element.

15. The apparatus according to claim 12, wherein the user equipment context modification request message comprises at least one multicast context identity associated with at least one multicast flow, wherein the x-cast radio bearer identity uniquely corresponds with at least one user equipment associated with at least one same semantic as the dedicated traffic channel identity.

16. The apparatus according to claim 12, wherein the at least one memory and the computer program code are configured to, with the at least one processor, cause the apparatus to:
initiate at least one radio resource connection reconfiguration procedure for each user equipment via dedicated signaling.

17. The apparatus according to claim 12, wherein the at least one memory and the computer program code are configured to, with the at least one processor, cause the apparatus to:
broadcast at least one x-cast radio bearer configuration via at least one system information message based upon a pre-determined time frequency period or in response to a request.

18. A method, comprising:
receiving, by a first network entity, at least one user equipment context modification request from a second network entity;
configuring, by the first network entity, at least one of one or more unicast channels and one or more multicast channels;
receiving, by the first network entity, multicast data; and
selecting, by the first network entity, at least one of the one or more multicast channels and the one or more unicast channels to transmit the multicast data, wherein the at least one user equipment context modification request comprises one or more of:
uplink tunnel end-point information;
downlink tunnel information;
at least one x-cast radio bearer identity;
quality of service information; and
at least one switching configuration.

* * * * *